United States Patent [19]

Hsich et al.

[11] Patent Number: 4,551,807

[45] Date of Patent: Nov. 5, 1985

[54] CURE-CONTROL METHOD FOR THERMOSETTING POLYMERIC MATERIAL

[75] Inventors: Henry S. Y. Hsich; Richard J. Ambrose, both of Erie, Pa.

[73] Assignee: Lord Corporation, Erie, Pa.

[21] Appl. No.: 523,863

[22] Filed: Aug. 17, 1983

[51] Int. Cl.$^4$ .................... G06F 15/46; B29H 5/02
[52] U.S. Cl. .................... 364/473; 364/476; 264/40.1; 264/40.6; 425/29; 425/30
[58] Field of Search .............. 364/473, 476; 264/40.1, 264/40.6; 425/29, 30

[56] References Cited

U.S. PATENT DOCUMENTS

| | | | |
|---|---|---|---|
| 3,649,729 | 3/1972 | Davis | 425/30 |
| 3,819,915 | 6/1974 | Smith | 425/29 |
| 3,980,743 | 8/1976 | Smith | 425/29 |
| 4,022,555 | 5/1977 | Smith | 425/29 |
| 4,344,142 | 8/1982 | Diehr, II et al. | 264/40.1 |

Primary Examiner—Jerry Smith
Assistant Examiner—Allen MacDonald
Attorney, Agent, or Firm—Clifford A. Poff; Thomas H. Murray

[57] ABSTRACT

Curing of rubber in a mold is disclosed wherein a desired modulus or viscosity for the cured rubber product is obtained on the basis of an equation developed from a relaxation phenomenon. The cure process may be isothermal and non-isothermal and is controlled in a manner to compensate for acceleration of the cure reaction due to an increase in carbon black filler loading and the effect thereof which broadens the relaxation spectrum. Control of the curing process for the rubber material according to the equation permits response to the effect of the presence of a filler which reduces the activation energy of the viscous flow and that the presence of the filler produces a small effect on the activation energy of the cure reaction.

11 Claims, 13 Drawing Figures

CURE-CONTROL METHOD FOR THERMOSETTING POLYMERIC MATERIAL

BACKGROUND OF THE INVENTION

This invention relates to a method for obtaining the desired properties such as mechanical or physical properties incident to curing thermosetting polymeric or elastomeric material. The invention is particularly useful for establishing and obtaining precisely desired properties of such materials.

Conventionally, in the past, it was the usual practice to use empirical formulae and rely on expertise developed from past experiences for cure control when molding synthetic or natural thermosetting polymers or elastomers, hereinafter referred to for brevity, as rubber material. A complete cure curve for obtaining properties of rubber material during curing could not be predicted. For example, it is a widely-accepted general rule that the rate of cure must be doubled for each 10° C. increase in cure temperature. It is also assumed that the cure time must be increased by 5 minutes for every ¼ inch thickness of rubber in the mold. As disclosed, for example, in U.S. Pat. No. 3,819,915 and British Pat. No. 1,293,941, an Arrhenius equation is set forth for calculating the cure time but, unfortunately, the equation cannot be utilized to predict or establish properties from a complete cure curve for the rubber during curing.

Understanding and predicting cure kinetics of elastomeric or thermosetting materials are useful both in the manufacturing process and performance and reliability of the manufactured rubber product. In most polymeric systems, however, the cure reactions are quite complex such that the general practice discussed previously cannot be utilized to explain and predict changes of the physical and mechanical properties of the rubber during the cure reaction. In the field of this invention, cure kinetics involved synthetic or natural rubber which may be compounded or have blended with it in the process of manufacture, various materials, such as pigments, fillers, waxes, oil, fibers, to obtain a wide range of properties, and may be combined with various structural materials, e.g., with textile fibers. Studies of cure kinetics are extensive but limited to the method of calorimetry such as differential scanning calorimetry or differential thermal analysis. The state of cure is not directly related to the physical, mechanical or rheological properties of the rubber. Kinetic models developed from the calorimetric method cannot be utilized to predict properties such as the viscosity and dynamic modulus. These properties are useful for determining the manufacturing operation and the end product performance of the rubber. Most polymeric systems of rubber do not behave according to the generally-accepted rules because the phenomenon of heat transfer and cure is oversimplified. The cure rate of the polymeric system depends on the basic polymers, curative, cure temperature and filler loading. Cure kinetics in the present invention are based on a non-equilibrium thermodynamic fluctuation theory of chemical relaxation. Known methods for predicting the viscosity and modulus during the cure of rubber can only be utilized to predict a narrow range of data during cure and polymer-filler interactions are excluded.

SUMMARY OF THE INVENTION

In accordance with the present invention, a desired property such as shear storage modulus or viscosity is established for cured rubber such as an elastomer or thermosetting polymeric material by the steps of establishing a desired property for the cured material according to the equation:

$$G(t) = G_e \exp\left[\frac{E}{RT(t)}\right] + \left[G_\infty - G_e \exp\left(\frac{E}{RT_C}\right)\right]\left\{1 - \exp\left[-\left(\int_{t_o}^{t_f}\frac{d(t-t_o)}{\tau}\right)^\beta\right]\right\}$$

where:

$$\tau = \tau_o(H/RT)$$

and where:
G(t) is the desired properties of rubber at time t;
$G_e$ is the constant representing the properties;
E is the activation energy for viscous flow;
H is the activation energy for cure reaction;
R is the gas constant, i.e., 1.98 cal./°K-mole;
T is the temperature;
$G_\infty$ is the property after complete cure;
$T_C$ is the equilibrium cure temperature;
$t_F$ is the final cure time;
$t_o$ is the induction time at $T_C$;
t is the time;
$\tau_o$ is a constant of the polymeric system; and
$\beta$ is the filler loading constant,
introducing into the cavity of a mold, a selected mass of thermosetting rubber material having a preselected composition, and terminating the cure of the material in the mold when the quantity G(t) reaches a desired quantity. When the desired property G(t) is shear storage modulus, the term $G_e$ represents a constant corresponding to modulus at temperature, T→∞. In a similar way, when the desired property G(t) is viscosity, the term $G_e$ represents a constant corresponding to viscosity of the rubber at Temperature, T→∞.

The present invention further provides apparatus for controlling the cure of such rubber material in a mold which is heated to cure the selected mass of rubber material having a preselected composition, the apparatus for this purpose includes electrical circuitry for establishing and, if desired, repeatedly establishing the desired property for the cured material according to the aforesaid equation, and means which are controllable in response to a signal from the electrical circuitry for terminating the cure of the rubber in the heated mold.

These features and advantages of the present invention as well as others will be more fully understood when the following description is read in light of the accompanying drawings, in which:

The underlying concept of the present invention is based on the fact that any chemical relaxation, i.e., reaction or structural relaxation, follows from the theory of irreversible thermodynamic fluctuation whereby changes of physical and mechanical properties during the relaxation process can be interpreted and predicted from the mean square fluctuations of thermodynamic ordering parameters. Physical or mechanical properties at any given cure time can be derived from the following relaxation function:

$$P(t) = P_o + (P_\infty - P_o)\left\{1 - \exp\left[-\left(\frac{t}{\tau}\right)^\beta\right]\right\} \quad (1)$$

where $P(t)$ is the physical or mechanical property at time t, and $P_o$ and $P_\infty$ are the initial and final values of the property. $\beta$ is a constant describing the width of the relaxation spectrum, and $\tau$ is the relaxation time which is a function of temperature, T and activation energy, H, of cure. The relaxation time, $\tau$, is defined as:

$$\tau = \tau_o \exp(H/RT) \quad (2)$$

where $\tau_o$ is a constant which represents the relaxation time at $T\to\infty$, R is the gas constant, and H is the activation energy.

Equation (1) can be used to not only predict the cure behavior of the rubber as measured by standard cureometers but also to explain the effect of fillers on the cure reaction. Moreover, a determination of scorch time and cure time of rubber with various filler loadings and cure temperatures can be derived from Equation (1). The discovery according to the present invention extends the relationship set forth by Equation (1) to determine a desired property, namely either the modulus or viscosity of rubber incident to the curing process. Shear modulus can be determined, i.e., by rewriting Equation (1) as follows:

$$G(t) = G_o + (G_\infty - G_o)\left\{1 - \exp\left[-\left(\frac{t - t_o}{\tau}\right)^\beta\right]\right\} \quad (3)$$

where $G(t)$ represents the shear modulus, and $G_o$ and $G_\infty$ are the minimum and maximum values of the shear modulus during cure, respectively; $t_o$ is the induction time defined as the time needed for polymeric systems to reach the temperature necessary for cure onset. Because of this, the cure curve decreases to a minimum value before it increases.

Non-isothermal cure of rubber is important and Equation (3) can be extended to include non-isothermal cure as follows:

$$G(t) = G_e \exp\left[\frac{E}{RT(t)}\right] + \Bigg[G_\infty - \quad (4)$$

$$G_e \exp\left(\frac{E}{RT_C}\right)\Bigg]\left\{1 - \exp\left[-\left(\int_{t_o}^{t_f}\frac{d(t - t_o)}{\tau}\right)^\beta\right]\right\}$$

where:
$G(t)$ is the desired modulus;
$G_e$ is a constant which represents the value of the shear modulus at temperature $T\to\infty$;
E is the activation energy which is ascribed to intermolecular forces;
$G_\infty$ is the shear modulus after complete cure;
$T_C$ is the equilibrium cure temperature;
$t_o$ is the induction time at $T_C$; and
$t_f$ is the final cure time.

Under isothermal conditions, $\tau$, is a function of temperature only. However, under non-isothermal conditions as in Equation (4), $\tau$ is a function of temperature which, in turn, is a function of time. This can be expressed as:

$$\tau = \tau_o \exp\left[\frac{H}{RT(t)}\right] \quad (5A)$$

$$T(t) = \int_o^t \frac{dT}{dt} dt \quad (5B)$$

In Equation (4), the term $G_e \exp[E/RT(t)]$ describes the effect of temperature on the property to be determined by the equation in the absence of cure. The remaining terms in Equation (4) describe the effect of the curing reaction on the property to be determined by the equation. Equations (3) and (4) can, therefore, be used to establish isothermal and non-isothermal cure curves.

To establish viscosity when curing rubber which is of vital importance, Equation (3) is modified as follows:

$$\eta(t) = \eta_o + (\eta_\infty - \eta_o)\left\{1 - \exp\left[-\left(\frac{t - t_o}{\tau}\right)^\beta\right]\right\} \quad (6)$$

Here, viscosity, $\eta$, can be either complex viscosity or real-part viscosity. The parameters $\eta_o$ and $\eta_\infty$ are the minimum and maximum values of $\eta$ on the cure curve.

For non-isothermal cure conditions, Equation (4) can be modified as follows for establishing viscosity of the rubber:

$$\eta(t) = \eta_e \exp\left[\frac{E}{RT(t)}\right] + \Bigg[\eta_\infty -$$

$$\eta_e \exp\left(\frac{E}{RT_C}\right)\Bigg]\left\{1 - \exp\left[-\left(\int_{t_o}^{t_f}\frac{d(t - t_o)}{\tau}\right)^\beta\right]\right\}$$

where $\eta_e$ is a constant which represents the value of viscosity at temperature $T\to\infty$.

Equations (4) and (7) can be written in terms of the desired property, modulus or viscosity as follows:

$$G(t) = G_e \exp\left[\frac{E}{RT(t)}\right] + \left[G_\infty - G_e \exp\left(\frac{E}{RT_C}\right)\right]\left\{1 - \exp\left[-\left(\int_{t_o}^{t_f} \frac{d(t-t_o)}{\tau}\right)^\beta\right]\right\}$$

where:

$$\tau = \tau_o(H/RT) \quad (9)$$

and where the terms in Equations (8) and (9) are defined as follows:

G(t) is the shear modulus or viscosity at time t;
$G_e$ is a constant representing modulus or viscosity at temperature $T \to \infty$;
E is the activation energy for viscous flow;
H is the activation energy for cure reaction;
R is the gas constant, i.e., 1.98 cal./°K.-mole;
T is the temperature;
$G_\infty$ is the modulus or viscosity property after complete cure;
$T_C$ is the equilibrium cure temperature;
$t_f$ is the final cure time;
$t_o$ is the induction time at $T_C$;
t is the time;
$\tau_o$ is a constant of the polymeric system; and
$\beta$ is the filler loading constant.

Figure 1:
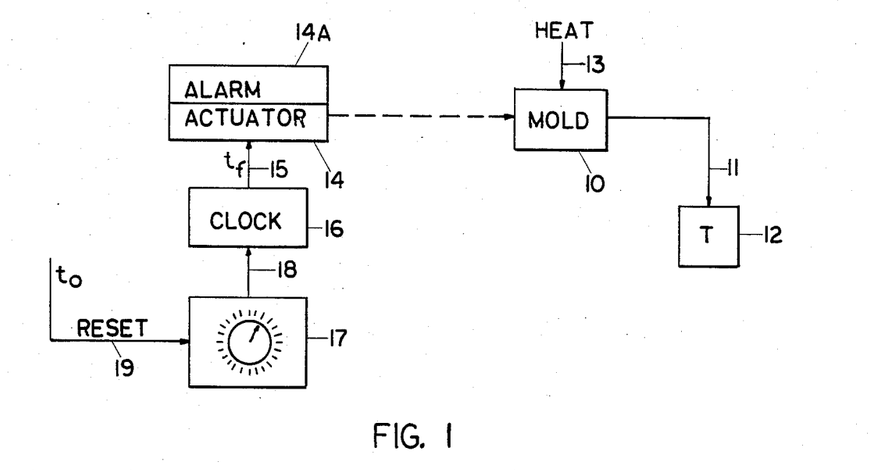
FIG. 1 schematically illustrates one embodiment of apparatus to carry out the curing of rubber material according to the present invention.

FIG. 1 illustrates one form of apparatus for establishing the desired property of a rubber before, during and/or after curing by using the relationship of cure kinetics described in Equations (8) and (9). A mold of the type well known in the art, per se, is identified by reference numeral 10 in FIG. 1 and provided with one or more temperature measuring devices such as thermocouples to measure the curing temperature of the mold cavity. The output signal or signals from the temperature measuring devices is delivered by line 11 to a display such as a numerical readout 12. The temperature T is utilized according to the present invention in terms of °K.; however, the readout device 12 may display the temperature in °C. or °F. from which the temperature in °K. can be readily obtained. The mold is heated in a manner, per se, well known in the art and line 13 denotes the supply of heat to the mold in a controlled manner as well known in the art. As is standard practice, the mold is open to expose a cavity wherein the curing of rubber material is carried out. An actuator 14 may be mechanically coupled to a mold part to expose the mold cavity. A selected mass of thermosetting polymeric material with a preselected composition is loaded into the mold cavity. The material is compounded in a desired manner and generally comprises crude rubber, curing agent, filler materials as well as, if desired, antioxidants, activators and coloring substances in quantities which have been established to produce the desired properties of the material upon curing. An alarm 14A and/or actuator 14 may be energized in response to an electrical signal in line 15 from a clock 16. The signal in line 15 is denoted as $t_f$, the final cure time which is preselected by, for example, positioning a dial on a signal generator 17. Generator 17 delivers a signal in line 18 to clock 16 corresponding to the desired cure time. The clock is reset by a signal $t_o$ in line 19 corresponding to the induction time at the equilibrium cure temperature $T_C$. The signal $t_o$ is, therefore, based on the attainment of the equilibrium cure temperature which is obtained by a readout of temperature indicator 12 and specifically when the temperature T corresponds to the equilibrium cure temperature. Before initiating a cure of the mass of rubber material in the mold and also during the actual cure thereof, the desired property of the material at final cure is determined according to Equations (8) and (9).

It will be observed from Equation (8) that the quantities G(t) and $G_e$ are generalizations of the property to be obtained by curing according to the equation. When the desired property is the shear storage modulus, then the quantity G(t) is the shear storage modulus at time t and $G_e$ is a constant representing the modulus temperature $T \to \infty$. On the other hand, when the property of concern is viscosity, then the quantity G(t) in Equation (8) is defined as viscosity at time t and the quantity $G_e$ corresponds to the viscosity temperature $T \to \infty$. All remaining terms in the equation are the same so that either the modulus or the viscosity of the cured rubber can be examined before, during and/or after the actual cure of the rubber at any given or selected cure time t and temperature T. As described hereinafter, Equations (8) and (9) can be solved by the use of computers in an electrical circuit shown in FIG. 2, for example, or with respect to FIG. 1, the clock is set to signal an operator or operates the actuator for terminating the molding operation upon expiration of the established time t. Time t is derived by the use of Equations (8) and (9). The present invention eliminates the trial-and-error or guesswork. The precise property which is desired for the cured article is established and can be obtained for each molding operation irrespective of cure temperature, change in the property and/or change to the configuration or mass of rubber material to be cured.

Figure 2:
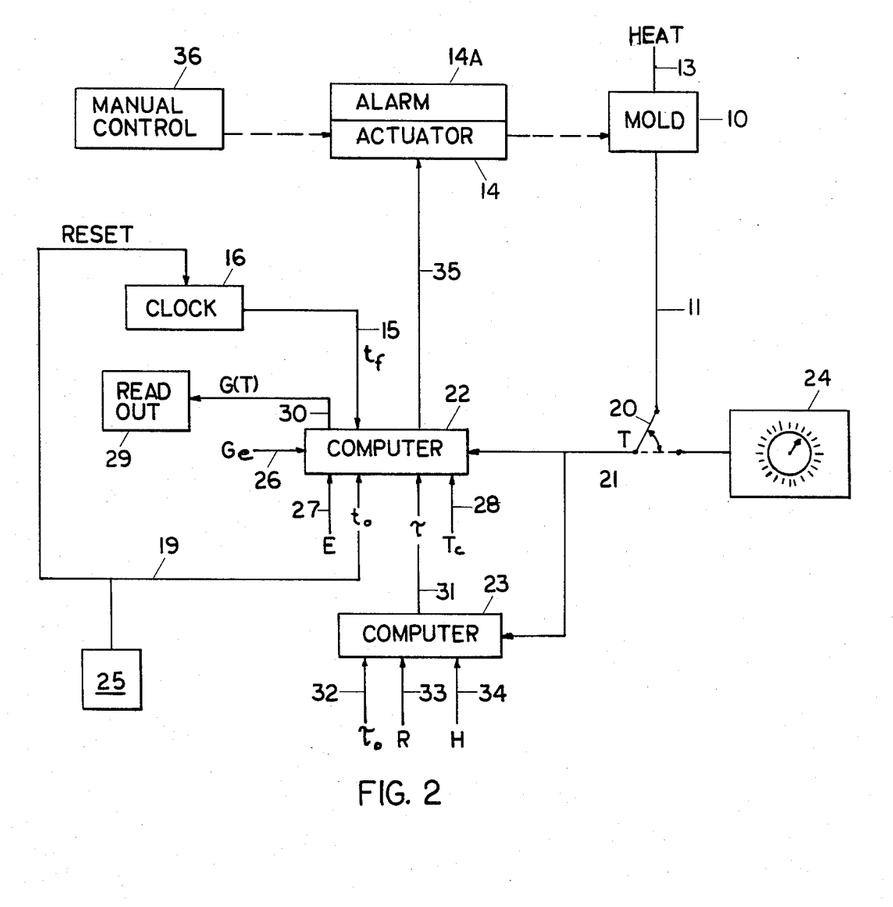
FIG. 2 is a schematic illustration of another embodiment of apparatus to carry out the curing of rubber material.

An electrical circuit is shown in FIG. 2 together with a mold which is identified by reference numeral 10 and corresponds to the mold shown in FIG. 1. Heat is applied to the mold cavity in a controlled manner as previously described and is indicated by reference numeral 13. Also, line 11 delivers an electrical signal corresponding to the temperature of the mold during the molding process. A switch 20 can be positioned to deliver a signal T in line 11 to line 21 which is coupled to a first computer 22 and a second computer 23. In the second position of the switch 20, an output signal T is delivered from a signal generator 24 which produces a signal T corresponding to a predetermined mold temperature.

A clock 16 is used in the circuitry of FIG. 2 to provide a signal $t_f$ which is delivered by line 15 to computer 22. A reset signal $t_o$ is generated in line 19 by a signal generator 25 which also delivers the signal $t_o$ to computer 22. Computer 22 also receives a signal in line 26 from a signal generator or the like corresponding to the value of $G_e$ which is a constant and represents either the modulus or viscosity of the cured material at a cure temperature T. A further signal generator is connected to deliver a signal E to computer 22 by line 27 and corresponds to the activation energy for the viscous flow of the curable material. Line 28 delivers a signal from a signal generator to the computer 22 corresponding to the equilibrium cure temperature $T_C$. A readout device 29 displays or otherwise indicates a signal on line 30 corresponding to G(t) which is the shear storage modulus or viscosity of time t as determined from Equation (8) by operation of the computer. Computer 22 is coupled by a line 31 to computer 23 by which the output signal τ of computer 23 is delivered and determined according to Equation (9). The computer 23 receives signals from signal generators in line 32 corresponding to $\tau_o$, a constant of the polymeric system of the thermosetting polymeric material; in line 33 corresponding to R, the gas constant, and in line 34 corresponding to H, the activation energy for the cure reaction. When a signal is delivered from clock 16 by line 15 corresponding to the set value $t_f$, the computer 22 delivers a control signal by line 35 to alarm 14A and/or actuator 14 to thereby signal an operator or energize the actuator for terminating the curing operation. A manual control 36 may be coupled to the actuator for operation by an operator when signaled by the alarm.

Figure 3:
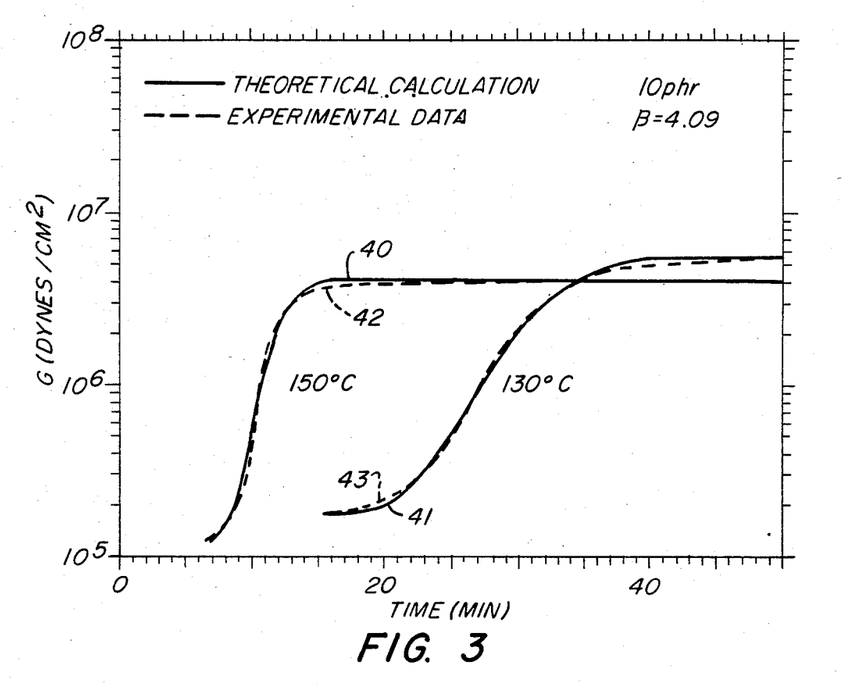
FIGS. 3–7 are graphs showing the shear storage modulus versus curing time of different samples of natural rubber based on experimental data and theoretical calculations for each rubber sample.
Figure 4:
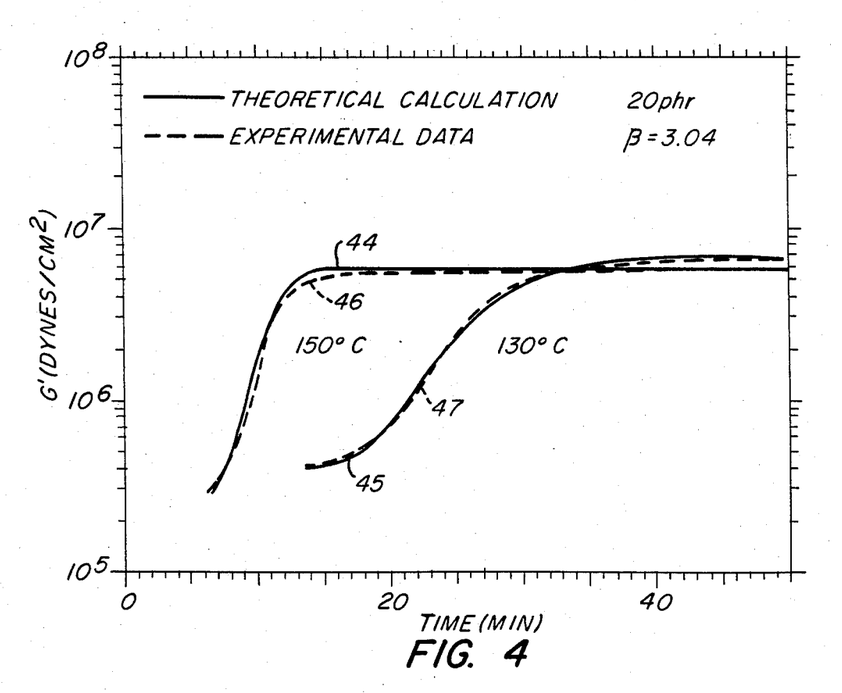
Figure 5:
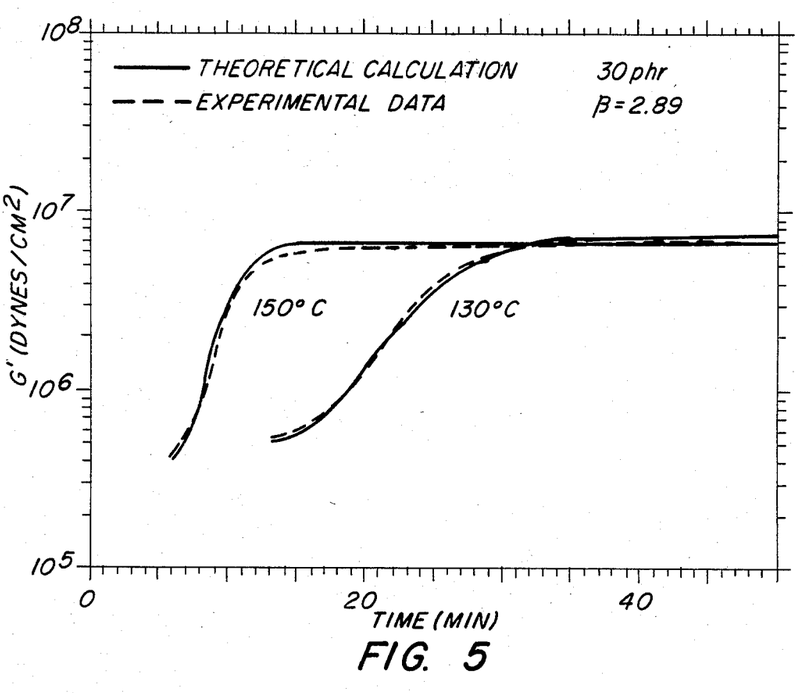
Figure 6:
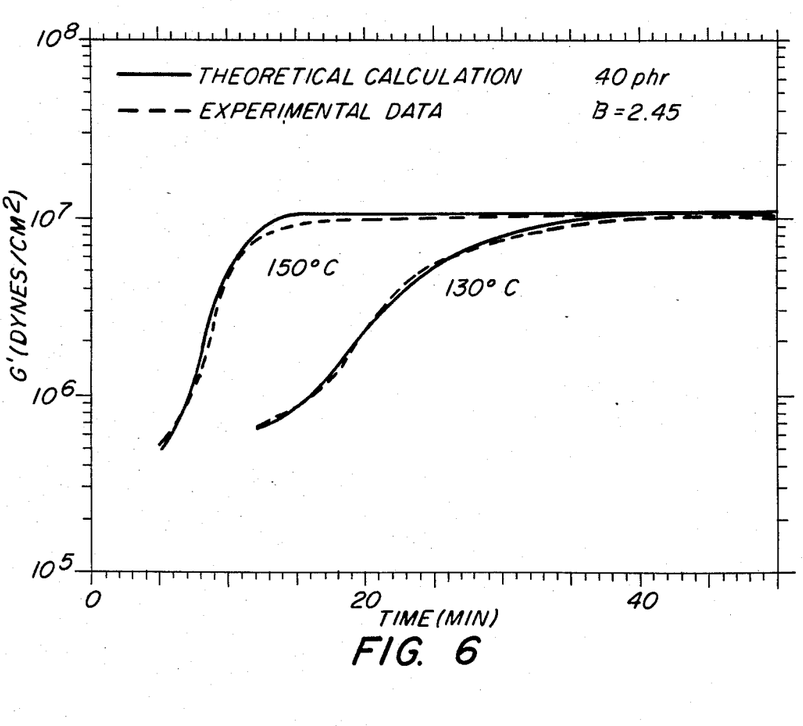
Figure 7:
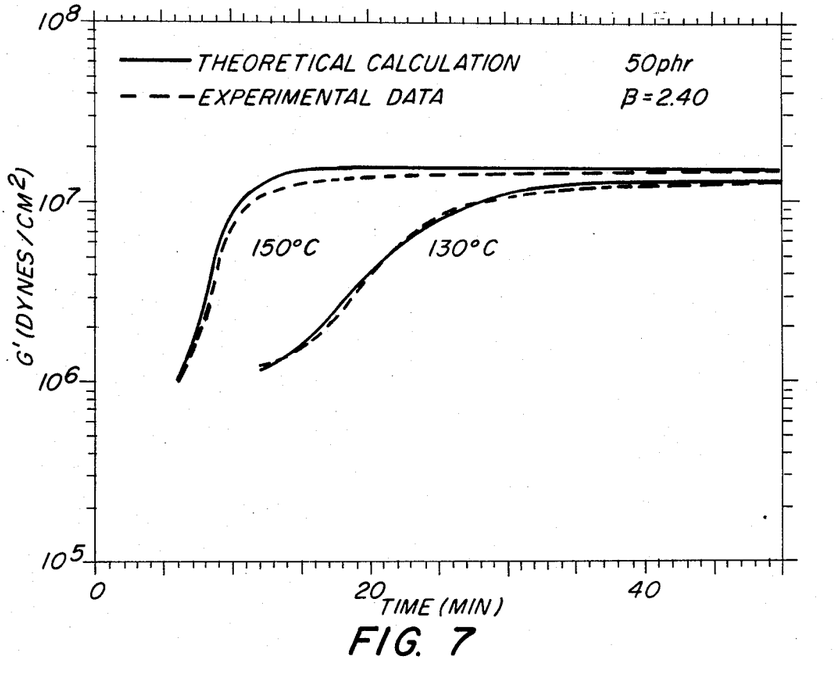

In FIG. 3, solid graph lines 40 and 41 depict the value of G(t) according to Equation (8) at cure temperatures of 150° C. and 130° C., respectively. Broken graph lines 42 and 43 represent experimental data obtained at cure temperatures of 150° C. and 130° C., respectively. The cure study represented by the graph lines in FIG. 3 is based on samples of material from natural rubber with 10 parts N-330 carbon black loading per 100 parts of rubber, giving a filler loading constant, β, for Equation (8) as 3.04. The shear storage modulus determined by using Equation (8) and shown by graph lines 40 and 41 shows good agreement with experimental data shown by graph lines 42 and 43, respectively. The value of the quantity H, the activation energy, was 18 kilocalories per mole. It can be seen, therefore, that the present invention enables one to produce a predetermined desired property in a cured rubber composition. In a similar way in FIG. 4, the graph lines 44 and 45 which are solid depict the property of rubber material cured at 150° C. and 130° C. cure temperatures, respectively. The rubber material contained 20 parts N-330 carbon black loading per 100 parts of rubber. The constant, β, is 3.04. Broken graph lines 46 and 47 depict experimental data of samples of the same rubber material at cure temperatures of 150° C. and 130° C., respectively. Again, it will be noted that graph lines 44 and 45 are in good agreement at the cure times for producing the desired property of the sample and the same is true with respect to graph lines 45 and 46. FIGS. 5-8 each contains two sets of graph lines for each of the cure temperatures 150° C. and 130° C. As before, each solid graph line depicts shear storage modulus throughout the range of cure times and the broken graph line, almost coincident therewith in each graph depicts the experimentally-obtained shear storage modulus data. In FIG. 6, the rubber material contains 40 parts N-330 carbon black loading per 100 parts of rubber. The constant, β, is 2.89. In FIG. 6, the rubber material contained 40 parts N-330 carbon black loading per 100 parts of rubber. The constant, β, is 2.45. In FIG. 7, the rubber material contained 40 parts N-330 carbon black loading per 100 parts of rubber. The constant, β, was 2.40.

Figure 8:
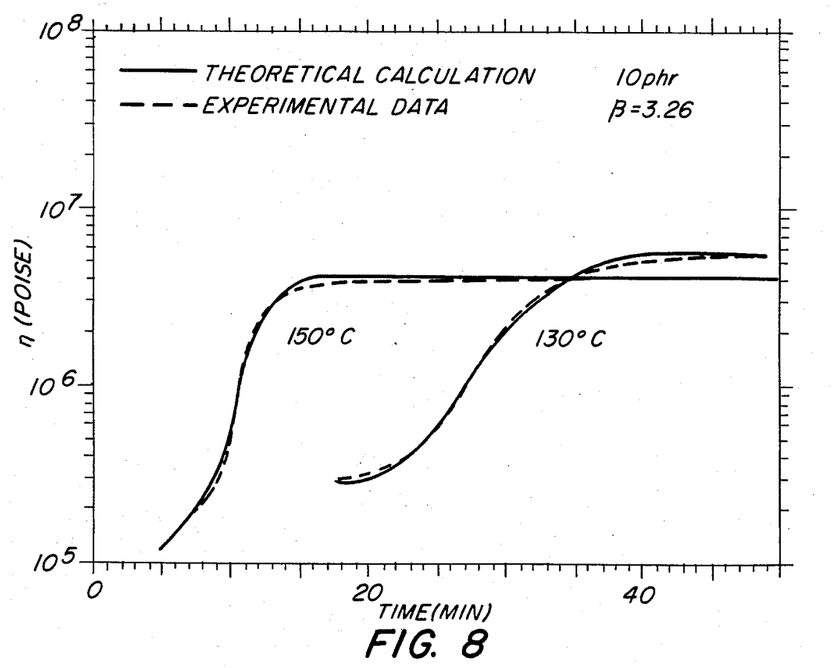
FIGS. 8–10 are graphs of various samples showing the complex viscosity at cure times in which each graph depicts theoretical calculations and experimental data for each rubber sample.
Figure 9:
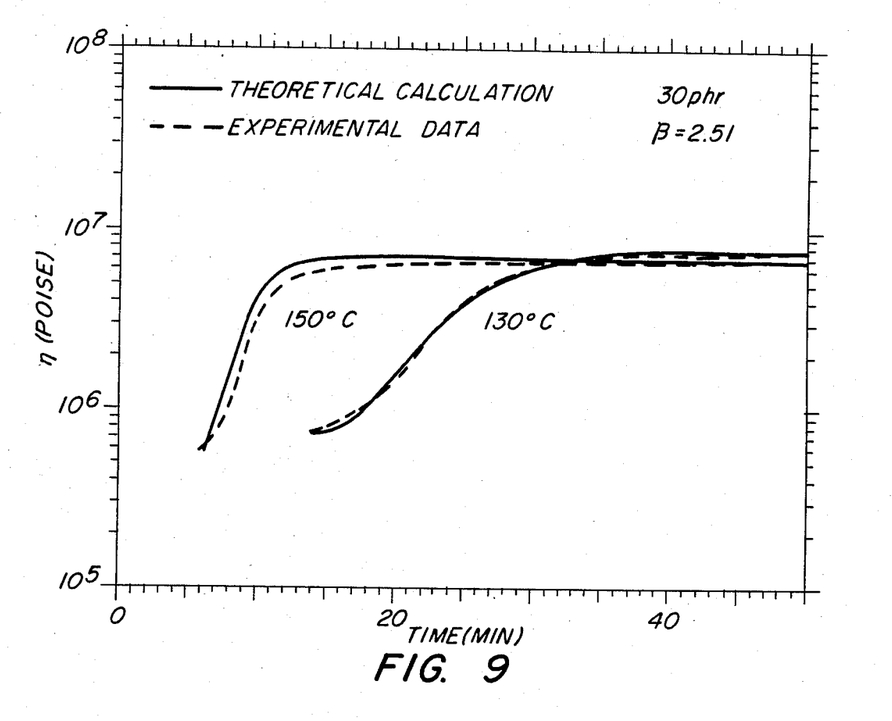
Figure 10:
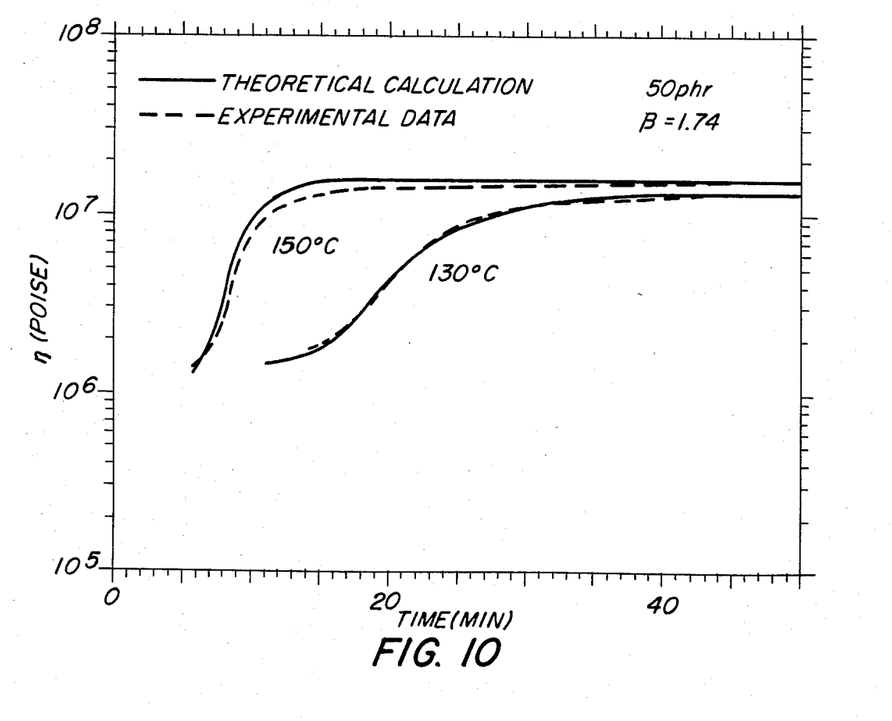

In FIGS. 8-10, complex viscosity is plotted against cure time using Equation (6) to fit the cure curves for, respectively, 10, 30 and 50 parts N-330 carbon black filler loading per 100 parts of rubber at cure temperatures of 130° C. and 150° C. The graph lines of experimental results again depicted as a broken line show good agreement with results established by the use of Equation (6) which are depicted as solid graph lines.

The value used for activation energy, H, was 18 kilocalories per mole.

Figure 11:
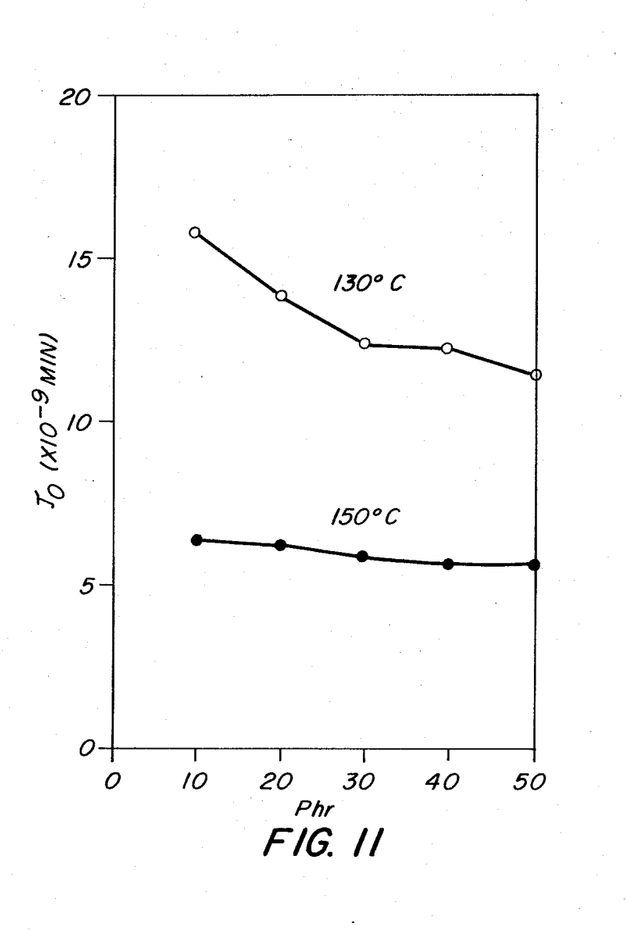
FIGS. 11–13 are graphs showing calculated and experimental data for the parameters $t_o$, $\tau_o$ and $\beta$, respectively.
Figure 12:
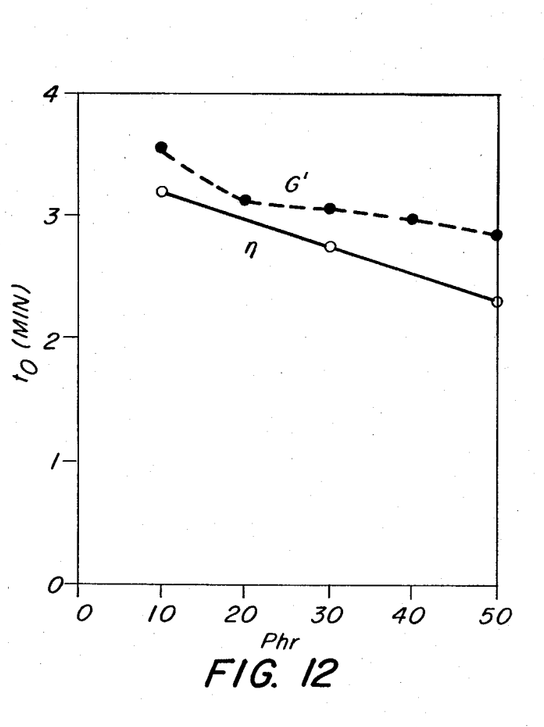
Figure 13:
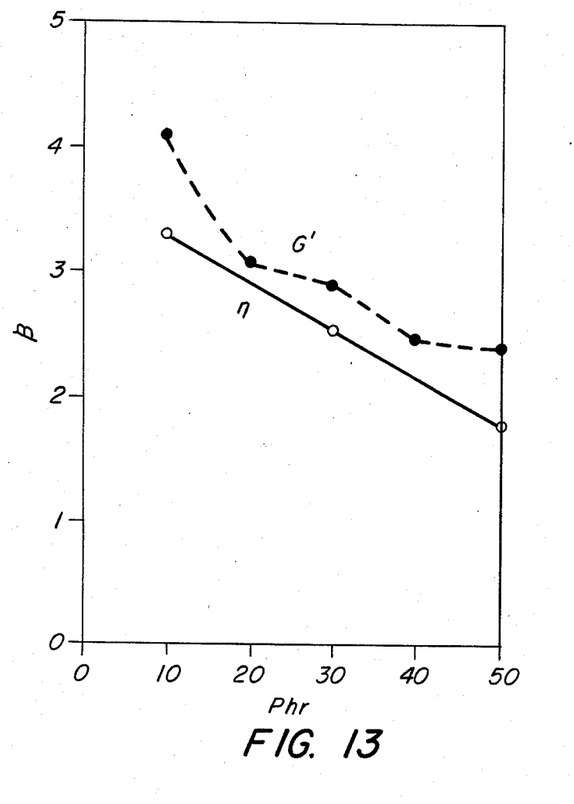

In FIGS. 9-11, values for the terms $t_o$, $\tau_o$ and β used for curve fitting both shear storage modulus and viscosity are plotted. The values for $\tau_o$ and β used for viscosity data are different from the values for these terms used to obtain shear storage modulus data. This finding is not surprising because the relaxation spectra for different properties have different shapes. However, the characteristics of the relaxation spectrum are, it is believed, similar for measurements for all different properties. The filler loading has little effect, it is believed, on activation energy of curing. The relaxation time for cure reaction time, however, decreases as filler loading increases. The induction time, $t_o$, of cure also decreases with increasing filler loading. These findings support the fact that an increase in filler loading serves to accelerate the cure reaction and, therefore, reduces the cure time. It can also be seen that an increase in filler loading broadens the relaxation spectrum. The broadening of this spectrum was observed in previous studies on viscosity/elastomer filler interaction and dynamic mechanical properties of cured rubber. The shape of the relaxation spectrum of the cure reaction depends on the amount of experimental information, i.e., the experimental frequency.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. A method for producing cured rubber material with a desired property, said method including the steps of establishing a desired property for the cured material according to the equation:

$$G(t) = G_e \exp\left[\frac{E}{RT(t)}\right] + \left[G_\infty - G_e \exp\left(\frac{E}{RT_C}\right)\right]\left\{1 - \exp\left[-\left(\int_{t_o}^{t_f} \frac{d(t-t_o)}{\tau}\right)^\beta\right]\right\}$$

where:

$$\tau = \tau_0(H/RT)$$

and where:
G(t) is a desired property of rubber at time t;
$G_e$ is a constant representing the property;
E is an activation energy for viscous flow;
H is an activation energy for cure reaction;
R is a gas constant, i.e., 1.98 cal./°K.-mole;
T is a temperature;
$G_\infty$ is a property after complete cure;
$T_C$ is an equilibrium cure temperature;
$t_f$ is a final cure time;
$t_o$ is an induction time at $T_C$;
t is a time;
$\tau_o$ is a constant of the polymeric system; and
β is a filler loading constant, introducing into a cavity of a mold a selected mass of rubber material having a preselected composition for curing said material in said mold, initiating curing of said material, and terminating curing of said material in said mold when the quantity G(t) attains a value according to said equation corresponding to the desired property by said step of establishing.

2. The method according to claim 1 wherein said step of establishing a desired property includes determining the value of the term G(t) according to said equation before said step of introducing.

3. The method according to claim 1 wherein said step of establishing a desired property includes determining the value of the term G(t) according to said equation after said step of introducing and before said step of terminating.

4. The method according to claim 1 wherein said step of establishing a desired property includes determining the value of the term G(t) according to said equation before said step of introducing and wherein said method includes the further step of determining the value of the term G(t) according to said equation during curing of said material in the mold and before said step of terminating the cure.

5. The method according to claim 1 wherein the value of the term G(t) defines the shear storage modulus of the rubber material and cure time t and wherein the value of the term $G_e$ defines a modulus constant of the rubber material in an uncured state.

6. The method according to claim 1 wherein the value of the term G(t) defines viscosity of the rubber material at cure time t and wherein the value of the term $G_e$ representing the viscosity of the rubber material in an uncured state.

7. The method according to claim 1 including the further step of clocking the cure time t and using the clocked cure time t for determining the property of said rubber material during curing thereof and before said step of terminating.

8. Apparatus for controlling the curing of rubber material, said apparatus including the combination of a mold wherein said material can be cured, means for heating said material in said mold, means for clocking the cure time of the material in said mold, electrical circuit means for determining the value of a desired property of said material before curing and during curing thereof in said mold according to the equation:

$$G(t) = G_e \exp\left[\frac{E}{RT(t)}\right] + \left[G_\infty - G_e \exp\left(\frac{E}{RT_C}\right)\right]\left\{1 - \exp\left[-\left(\int_{t_o}^{t_f}\frac{d(t-t_o)}{\tau}\right)^\beta\right]\right\}$$

where:

$$\tau = \tau_0(H/RT)$$

and where:
G(t) is a desired property of rubber at time t;
$G_e$ is a constant representing the property;
E is an activation energy for viscous flow;
H is an activation energy for cure reaction;
R is a gas constant, i.e., 1.98 cal./°K.-mole;
T is a temperature;
$G_\infty$ is a property after complete cure;
$T_C$ is an equilibrium cure temperature;
$t_f$ is a final cure time;
$t_o$ is an induction time at $T_C$;
t is a time;
$\tau_o$ is a constant of the polymeric system; and
$\beta$ is a filler loading constant,
and means for terminating the cure of material in said mold when the value of the term G(t) is determined to correspond to the desired value thereof by operation of said electrical circuit means.

9. The apparatus according to claim 8 further including means for providing a signal to said electrical circuit means corresponding to cure temperature, and means for producing a signal by said electrical circuit means corresponding to a final cure time.

10. The apparatus according to claim 8 further including means for providing a signal to initiate clocking of the cure time of said material by said mold.

11. The apparatus according to claim 8 wherein said electrical circuit means includes a computer.

* * * * *